UNITED STATES PATENT OFFICE.

CHARLES H. NICHOLS, OF TOLEDO, OHIO.

IMPROVEMENT IN COFFEE-POLISHES.

Specification forming part of Letters Patent No. 177,954, dated May 30, 1876; application filed October 9, 1875.

*To all whom it may concern:*

Be it known that I, CHARLES H. NICHOLS, of Toledo, in the county of Lucas and State of Ohio, have invented a new and useful Coffee-Polish, which compound is fully described in the following specification:

This invention relates to that class of compounds used for polishing coffee after it is roasted; and it consists in the combination of materials as set forth in the following formula.

Mix together arrow-root, two ounces; milk, two ounces; wheat or rye flour, eight ounces; sugar of starch, eight ounces. Dissolve in five gallons of a decoction of coffee in water.

Before withdrawing the charge of coffee from the roasting-cylinder a sufficient quantity of the polishing-fluid should be introduced to coat the surface of all the berries in the batch, on which it will dry under the action of the heat, closing all the pores, to retain the volatile aroma, and at the same time imparting to the coffee a glossy luster, which improves its appearance and makes it more salable.

What I claim as my invention is—

The compound for polishing coffee, consisting of arrow-root, milk, wheat or rye flour, sugar of starch, all dissolved in a decoction of coffee in water, in about the proportions described.

CHAS. H. NICHOLS.

Witnesses:
H. S. SPRAGUE,
CHAS. J. HUNT.